May 24, 1960  E. P. WARNKEN  2,937,805
STATOR BLADE ASSEMBLY AND METHOD AND MACHINE FOR MAKING SAME
Filed Dec. 15, 1952  2 Sheets-Sheet 1
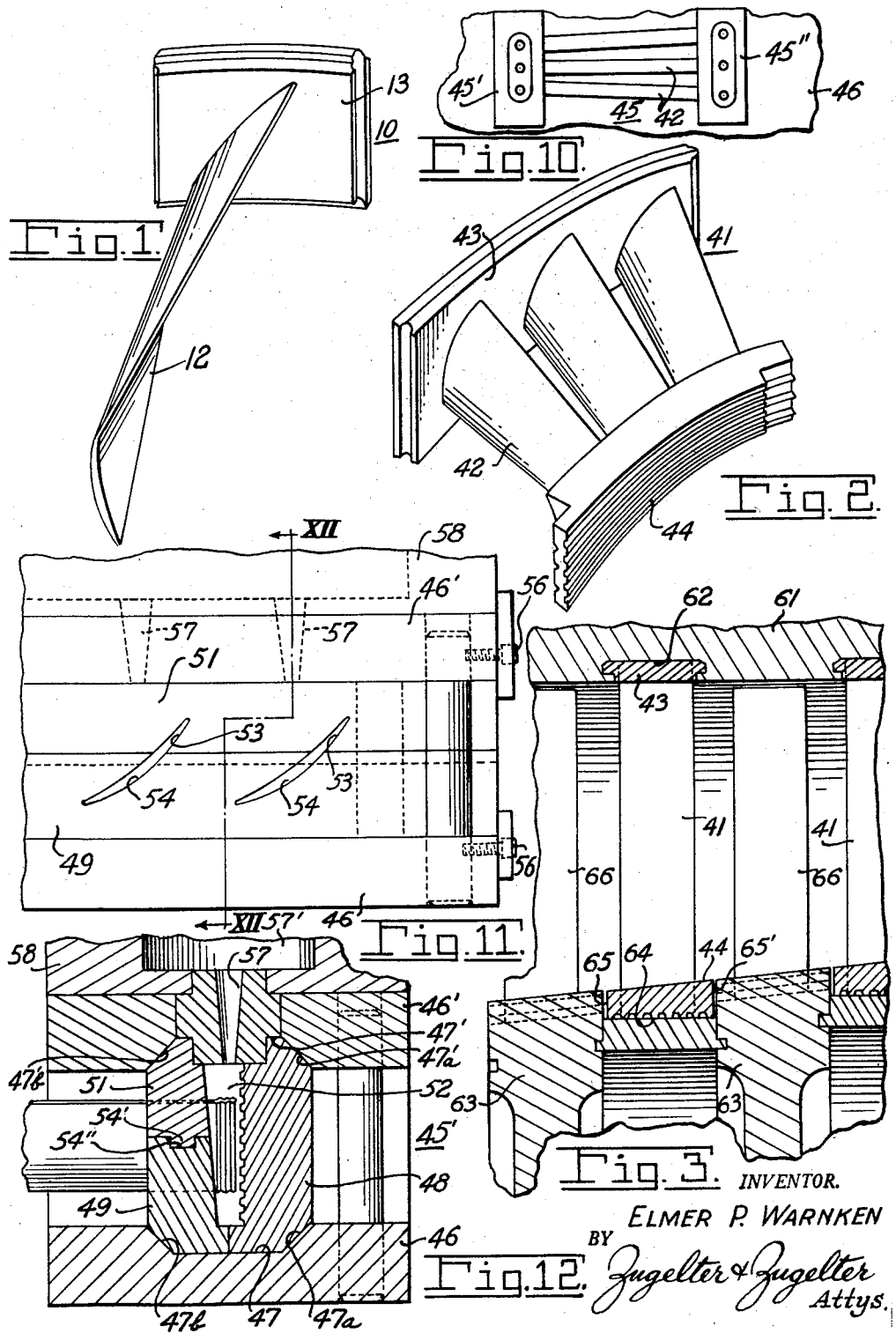
INVENTOR.
ELMER P. WARNKEN
BY
Zugelter & Zugelter
Attys.

May 24, 1960   E. P. WARNKEN   2,937,805
STATOR BLADE ASSEMBLY AND METHOD AND MACHINE FOR MAKING SAME
Filed Dec. 15, 1952   2 Sheets-Sheet 2
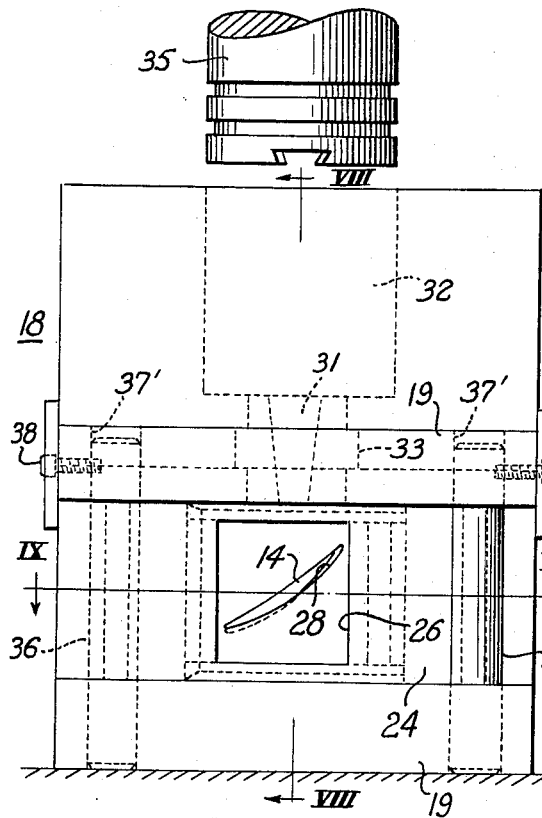
Fig. 7.
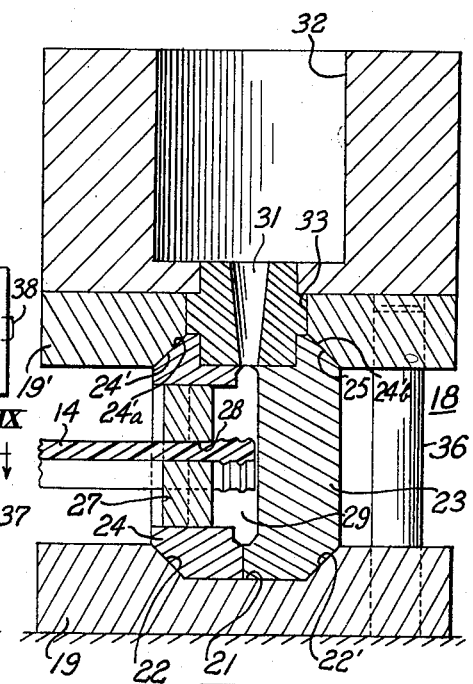
Fig. 8.
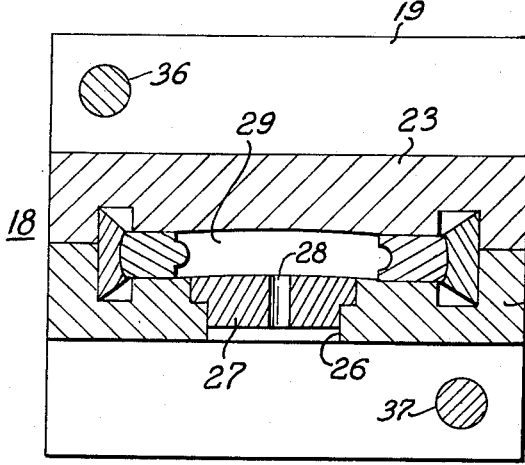
Fig. 9.
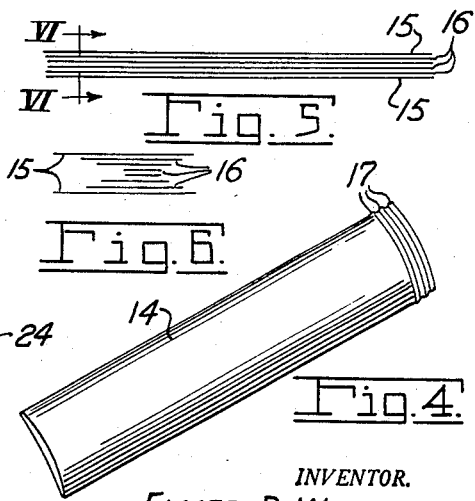
Fig. 5.
Fig. 6.
Fig. 4.
INVENTOR.
ELMER P. WARNKEN
BY
Zugelter & Zugelter
Attys.

United States Patent Office 2,937,805
Patented May 24, 1960

2,937,805

STATOR BLADE ASSEMBLY AND METHOD AND MACHINE FOR MAKING SAME

Elmer P. Warnken, Cincinnati, Ohio, assignor, by mesne assignments, to Studebaker-Packard Corporation, South Bend, Ind., a corporation of Michigan Filed Dec. 15, 1952, Ser. No. 326,002

2 Claims. (Cl. 230—132)

This invention relates to stator blades for a turbo-compressor and to a method and machine for making stator blades.

An object of this invention is to provide a stator blade having a vane portion which is molded from resin-impregnated glass fibre laminations and having a root or key molded at one end thereof.

A further object is to provide a blade of this character in which the laminations of the vane extend lengthwise thereof to give the vane great strength along its length.

A further object of this invention is to provide a blade having a key or root molded from a mixture of relatively short glass fibres and a thermosetting resin.

A further object of this invention is to provide a blade assembly for the stator of a turbo-compressor which comprises a plurality of vanes joined together at their ends.

A further object of this invention is to provide a machine for forming such stator blades and stator blade assemblies.

A further object of this invention is to provide a machine for molding key and stay members on the opposite ends of a plurality of vanes to joint the vanes together into a blade assembly.

A further object of this invention is to provide a method for forming such blades and blade assemblies in which the vanes thereof are first molded and, after the vanes have been molded, a root or key member is molded to the outer ends of a group of vanes and a stay member is molded on the inner ends thereof.

The above and other objects and features of this invention will in part be apparent and will in part be obvious from the following description and the drawings, in which:

Figure 1 is a perspective view showing a stator blade constructed in accordance with an embodiment of this invention;

Fig. 2 is a perspective view showing a stator assembly including three vanes, the assembly being constructed in accordance with another embodiment of this invention;

Fig. 3 is a fragmentary view in longitudinal section of the air compressor section of a jet aircraft engine showing the blade assembly illustrated in Fig. 2 mounted therein.

Fig. 4 is a perspective view showing a vane in its condition before a key or root portion is molded thereon;

Fig. 5 is a diagrammatic view in side elevation showing the laminations from which the vane shown in Fig. 4 is formed;

Fig. 6 is a view in section taken along a line VI—VI in Fig. 5;

Fig. 7 is a view in front elevation showing a machine for molding the key or root of the blade illustrated in Fig. 1, a vane being shown therein;

Fig. 8 is a view in section taken along a line VIII—VIII in Fig. 7;

Fig. 9 is a view in section taken along a line IX—IX in Fig. 7, the vane being removed;

Fig. 10 is a plan view of a machine for molding the stator assembly illustrated in Fig. 2;

Fig. 11 is a fragmentary view in front elevation of one section of the machine illustrated in Fig. 10, the section shown being employed in molding the stay or inner end of the assembly illustrated in Fig. 2; and Fig. 12 is a view in section taken along a line XII—XII in Fig. 10, a vane being shown in position therein.

In the following detailed description, and the drawings, like reference characters indicate like parts.

In Fig. 1 is shown a stator blade 10 having a vane portion 12 and a key or root member 13 at the outer end of the vane. The vane 12 is formed first to the shape shown at 14 in Fig. 4 before the key 13 is molded thereon. The vane is formed from a plurality of flat laminations 15 and 16 of resin-impregnated glass cloth or the like (see Figs. 5 and 6). The laminations 15 and 16 are molded by heat and pressure to form the vane member 14 as shown in Fig. 4, the vane in transverse section having an airfoil surface. The vane is formed in a mold (not shown) having appropriate grooves in which ribs 17 are molded transversely of the vane at one end thereof, as shown in Fig. 4. The laminations of the vane 16 extend lengthwise thereof so that the completed vane has great strength along its length. The glass fibre laminations may be of the type disclosed in my co-pending application Serial Number 154,333 filed April 6, 1950, now Patent No. 2,746,514. The inner laminations 16 may be of a relatively loosely woven glass fibre cloth while the outer laminations may be of closely or tightly woven glass fibre cloth. For greatest strength the inner laminations are formed of parallel elongated side by side glass fibre rovings extending the length of the vane. The rovings from the body of the vane may be covered with outer layers of glass fibre cloth.

The key 13 (Fig. 1) is molded on the ribbed end of vane member 14. A machine 18 for molding the key 13 is shown in Figs. 7, 8, and 9. This molding machine includes a base member 19 and a wedging plate or cap member 19'. Base member 19 has a groove 21 provided with downwardly and inwardly sloping wedging faces 22 and 22' in which groove a rear die member 23 and a front die-holding member 24 are received. Member 19' is provided with a groove having downwardly and outwardly sloping sides 24' and 25 which engage complementary sloping faces 24'a and 24'b at the tops of members 24 and 23. When cap member 19' is forced down upon the members 23 and 24, they are forced into abutting contact by the wedging action of faces 22, 22', 24' and 25.

The forward die-holding member 24 is provided with a window 26 in which a forward die member 27 is mounted, as shown in Figs. 8 and 9. Forward die member 27 is slotted, as indicated at 28 to receive the vane member 14, the slot conforming to the shape of the vane. An enclosed space 29 is formed between rear die member 23 and the forward die member 27. The space 29 is of the size and shape required to form the key 13. The ribbed end of vane member 14 projects into the space 29, as shown in Figure 8, so that the key can be molded thereon.

The key is molded from short, resin-impregnated glass fibres. The fibres employed may be of the type commonly known as "60 end rovings" and are cut or chopped to a length of about one-third (⅓) of an inch each to be of a size which transfer well and give good strength. The short fibres are impregnated with the same resin as the vane laminations. The resin-impregnated fibres are injected or transferred into the space 29 through a nozzle 31 (Fig. 8) mounted in the bottom of a pot 32. As shown, nozzle 31 is received in openings in the bottom of pot 32 and in the cap member 19', and is supported by a flange 33 on die members 23 and 24. The resin-impregnated short fibres in the pot 32 are expelled through nozzle 31 into the space 29 by means of a vertically movable ram 35. The ram 35 may be driven downwardly by any appropriate means, for example, by hydraulic mechanism or the like (not shown).

When the resin-impregnated glass fibres have been transferred into the space 29 the ram is permitted to dwell for a sufficient time to permit proper curing of the resin. Then, the ram 35, the pot member 32 and the cap 19' may be raised to release the die member 23 and die-holding member 24. The molded blade can then be removed from die member 27 by pulling the same through slot 28.

During raising and lowering of the pot and nozzle, the cap member 19' and the base member 19 are aligned by pins 36 and 37. The pins 36 and 37 are mounted in base member 19 and are received in bores 37' in the cap member. The pins so guide the cap member that, when the cap member is lowered to the position shown in Figs. 7 and 8, the die members are properly aligned. The cap member 19', the pot-forming member 32 and the front die-holding member 24, and the rear die member 23 are held in alignment by cap screws 38, which are mounted in cap member 19'.

In Fig. 2, a blade assembly 41 is illustrated, which comprises a plurality of vanes 42. The outer ends of vanes 42 are joined by a key or root member 43. The inner ends of vanes 42 are joined by a stay or shroud member 44. The vanes are first molded and then the key and stay members are molded on the outer and inner ends of the vanes, respectively. The vanes of assembly 41 may be formed in the same way as vane 14 (Fig. 4) and may be ribbed at both ends.

In Figs. 10, 11 and 12 is shown a machine 45 for molding the stay member 44 and the key member 43 on the vanes 42. The machine 45 (Fig. 10) includes a stay molding section 45' and a key molding section 45". The sections 45' and 45" are mounted on an appropriate base plate 46. The sections 45' and 45" are generally similar in construction, and only the stay molding section 45' will be described in detail.

The stay molding section 45' of the machine 45 (Figs. 11 and 12) includes a base member 46 and a cap member 46'. Base member 46 has a groove 47 therein, and cap member 46' has a groove 47' therein. The grooves 47 and 47' have sloping wedging faces 47a—47b and 47'a—47'b, respectively, for wedging a rear die member 48 and a lower front die member 49 together. The lower front die member 49 and an upper front die member 51 co-operate with the rear die member 48 to form a cavity 52 therebetween of the shape and size of the stay member 44. As shown in Fig. 11, the upper and lower front die members 51 and 49 are provided with aligned slots 53 and 54 for receiving vane members 14 with one of the ribbed ends of each vane member in the cavity 52. The die members 49 and 51 are kept in alignment by a tongue 54' and groove 54" therebetween. The die members are held in alignment with base member 46 and a cap member 46' by cap screws 56 (Fig. 11). Resin-impregnated short glass fibres are transferred into the cavity 52 (Fig. 12) through nozzles 57 to mold the stay member 44 on the vanes 42. The short fibres may be forced into the cavity 52 by the appropriate ram (not shown) operating in a pot 57' above the nozzles 57. When the short fibres have been transferred into cavity 52 to form the stay member, and the resin has been cured for a sufficient time, the nozzle 53 and the nozzle-supporting members 46' and 58 are raised to release the die members so that the die members can be separated from the vanes.

The key molding device 45" (Fig. 12) is similar in construction to the stay molding device 45' (already described) with the exception that the cavity thereof is of proper shape for forming the key 43.

As shown in Fig. 3, the stator blade assembly 41 is mounted on the stator member 61 of a jet aircraft engine compressor section. The key member 43 is received in a keyway 62 in stator member 61. The stay member 44 terminates adjacent the rotor member 63 of the compressor section. As shown, the inner face 64 of the stay member 44 is provided with a plurality of parallel peripheral ribs to have a light rubbing contact with the rotor and form substantially an air seal between the stator assembly 41 and the rotor 63. As shown in Fig. 3, the leading edge 65 of stay member 44 is thinner than the trailing edge 65' because of the taper of the compressor section of the engine. As shown in Fig. 3, stator assembly 41 is mounted between banks of rotor blades 66. The rotor blades are carried by rotor 63. The rotor blades may be of any suitable type and the impeller vanes of the rotor blades drive air past the stator blade vanes.

The stator blades and assemblies and the machines for making them illustrated in the drawings and described above, are subject to structural modification without departing from the spirit and scope of the appended claims.

Having described my invention, what I claim as new and desire to secure by Letters Patent is:

1. An airfoil blade which comprises an elongated airfoil vane consisting essentially of elongated resin-impregnated laminations of glass fibres extending lengthwise of the vane, there being a plurality of ribs at one end of the vane extending transversely thereof, and a key member united with the outside of the ribbed end of the vane, the key member consisting essentially of short staple glass fibres impregnated with a resin, the resin of the key member interlocking with the ribs of the vane.

2. A compressor blade assembly which comprises a plurality of radially spaced elongated vanes composed of elongated resin-impregnated laminations of glass fibres extending lengthwise of the vanes, there being a plurality of transverse ribs on the outer end of each vane, and a key member consisting essentially of short staple randomly arranged resin-impregnated glass fibres united with the outer ends of the vanes and to the ribs thereof.

References Cited in the file of this patent

UNITED STATES PATENTS

| | | |
|---|---|---|
| 1,035,364 | Leblanc | Aug. 13, 1912 |
| 1,470,503 | Strunstrup | Oct. 9, 1923 |
| 2,046,737 | Gosslau | July 7, 1936 |
| 2,482,375 | Sensenich | Sept. 20, 1949 |
| 2,498,031 | Diess | Feb. 21, 1950 |
| 2,548,886 | Howard | Apr. 17, 1951 |
| 2,599,654 | Musikant | June 10, 1952 |
| 2,610,786 | Howard | Sept. 16, 1952 |
| 2,621,140 | Bitterli et al. | Dec. 9, 1952 |
| 2,624,071 | Strahm et al. | Jan. 6, 1953 |

FOREIGN PATENTS

| | | |
|---|---|---|
| 128,190 | Australia | July 2, 1948 |
| 502,409 | Great Britain | Mar. 13, 1939 |
| 591,135 | Great Britain | Aug. 8, 1947 |